(12) United States Patent
Jo

(10) Patent No.: US 11,267,436 B2
(45) Date of Patent: Mar. 8, 2022

(54) APPARATUS AND METHOD FOR DETECTING PASSENGER AND WEARING SEAT BELT BASED ON IMAGE

(71) Applicant: Hyundai Mobis Co., Ltd., Seoul (KR)

(72) Inventor: Pyeong Geun Jo, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 126 days.

(21) Appl. No.: 16/670,388

(22) Filed: Oct. 31, 2019

(65) Prior Publication Data

US 2020/0172048 A1 Jun. 4, 2020

(30) Foreign Application Priority Data

Nov. 29, 2018 (KR) .................. 10-2018-0150589

(51) Int. Cl.
*G06K 9/00* (2006.01)
*G06K 9/32* (2006.01)
(Continued)

(52) U.S. Cl.
CPC .......... *B60R 22/48* (2013.01); *G06K 9/00228* (2013.01); *G06K 9/00369* (2013.01);
(Continued)

(58) Field of Classification Search
CPC . B60R 22/48; B60R 11/04; B60R 2011/0003; B60R 2011/0026;
(Continued)

(56) References Cited

U.S. PATENT DOCUMENTS 10,005,425 B2 6/2018 Becker et al.
10,296,797 B2 5/2019 Porsch
(Continued)

FOREIGN PATENT DOCUMENTS

CN 1822971 A 8/2006
CN 101072701 A 11/2007
(Continued)

OTHER PUBLICATIONS

Alexey Kashevnik, Ammar Ali, Igor Lashkov, and Nikolay Shilov "Seat Belt Fastness Detection Based on Image Analysis from Vehicle In-Cabin Camera"; Apr. 20-24, 2020; 2020 26th Conference of Open Innovations Association (FRUCT); pp. 143-150. (Year: 2020).*

*Primary Examiner* — Siamak Harandi

(74) *Attorney, Agent, or Firm* — H.C. Park & Associates, PLC

(57) ABSTRACT

Disclosed herein is an apparatus for detecting a passenger and wearing seat belt based on an image, which includes an image detector configured to detect an image of an interior of a vehicle, which is captured using a camera, a controller configured to analyze the image of the interior of the vehicle, which is captured through the image detector, and determine whether a passenger is present and whether the passenger wears a seat belt, and an information output part configured to output a warning or an alarm according to discrimination of the passenger from an object, which is determined by the controller, the presence or absence of the passenger, and whether the passenger wears the seat belt.

12 Claims, 4 Drawing Sheets

(51) Int. Cl.
*B60R 22/48* (2006.01)
*G06K 9/20* (2006.01)
*B60R 11/00* (2006.01)
*B60R 11/04* (2006.01)

(52) U.S. Cl.
CPC ......... *G06K 9/00838* (2013.01); *G06K 9/209* (2013.01); *G06K 9/3233* (2013.01); *B60R 11/04* (2013.01); *B60R 2011/0003* (2013.01); *B60R 2011/0026* (2013.01); *B60R 2011/0028* (2013.01); *B60R 2022/4866* (2013.01)

(58) Field of Classification Search
CPC ..... B60R 2011/0028; B60R 2022/4866; B60R 2022/4808; B60R 21/01538; B60R 21/01544; B60R 21/01552; B60R 21/01554; B60R 25/102; G06K 9/00838; G06K 9/00369; G06K 9/3233; G06K 9/00832; G06K 9/00228; G06K 9/209
See application file for complete search history.

(56) References Cited

U.S. PATENT DOCUMENTS

| | | | |
|---|---|---|---|
| 10,549,718 B2 * | 2/2020 | Ishibashi | B60R 22/48 |
| 10,829,072 B2 | 11/2020 | Miller et al. | |
| 2007/0223910 A1 * | 9/2007 | Aoki | H04N 7/181 |
| | | | 396/301 |
| 2009/0234542 A1 | 9/2009 | Orlewski | |
| 2015/0286883 A1 * | 10/2015 | Xu | G06K 9/6202 |
| | | | 382/103 |
| 2016/0078306 A1 * | 3/2016 | Artan | G06K 9/6269 |
| | | | 382/104 |
| 2017/0247015 A1 * | 8/2017 | Davis | G08B 21/0205 |

FOREIGN PATENT DOCUMENTS

| | | | | |
|---|---|---|---|---|
| CN | 206520507 U | | 9/2017 | |
| CN | 107428302 A | | 12/2017 | |
| FI | 20115502 | * | 5/2011 | ......... G06K 9/00845 |
| KR | 10-2001-0102409 | | 11/2001 | |
| KR | 20150045235 | * | 4/2015 | ............... G06T 7/00 |

\* cited by examiner

☐: ROI#1: ROI # 1 FOR DETECTING FACE
☐: ROI#2: ROI # 2 FOR DETECTING APPEARANCE, EMPTY SEAT, OBJECT, AND CAR SEAT

APPARATUS AND METHOD FOR DETECTING PASSENGER AND WEARING SEAT BELT BASED ON IMAGE

CROSS-REFERENCE TO RELATED APPLICATION

This application claims priority from and the benefit of Korean Patent Application No. 10-2018-0150589, filed on Nov. 29, 2018, which is hereby incorporated herein by reference for all purposes as if set forth herein.

BACKGROUND

Field

Exemplary embodiments of the present disclosure relate to an apparatus and a method for detecting a passenger based on an image, and more particularly, to an apparatus and a method for detecting a passenger based on an image, which are capable of accurately detecting a passenger or an accompanying passenger using an image without adding a separate sensor to a vehicle and enhancing safety and convenience of a user by detecting whether a seat belt is worn.

Discussion of the Background

Generally, a seat belt reminder (SBR) system of a vehicle is a system for checking whether a passenger rides in the vehicle and whether a seat belt is worn and transferring information (i.e., whether the passenger rides in the vehicle and whether the seat belt is worn) to an electronic control unit (ECU). When the passenger does not wear the seat belt, the ECU warns through an alarm using the information provided from the SBR.

For example, the SBR system has with an SBR mat in which a sensor is provided in a seat of the vehicle to determine whether the passenger rides in the vehicle, determines whether the seat belt is worn using a buckle switch, and transmits the determination result to the ECU. Accordingly, when it is determined that the passenger rides in the vehicle but does not wear the seat belt through the transmitted determination result, the ECU warns through a warning lamp or a chime bell.

In this case, the sensor provided in the SBR mat of the SBR system is generally placed on a foam of a seat cushion, and this product is subject to constant stress according to the riding of the passenger. Further, since one sensor detects only one seat for occupancy, in order to determine whether a rear seat passenger rides in the vehicle, a separate sensor is required at a passenger seating portion of a rear seat so that this becomes a cause of increasing a manufacturing cost of the vehicle.

Therefore, there is a need for a method of detecting a passenger without the need to add a separate sensor or change a structure of a line (harness).

A related art of the present disclosure is disclosed in Korean Patent Publication No. 10-2001-0102409 (published on Nov. 15, 2001 and titled "System and method for detecting an object or a person in a vehicle interior and device for the protection of occupants in a vehicle with such a system").

The above information disclosed in this Background section is only for enhancement of understanding of the background of the invention and, therefore, it may contain information that does not constitute prior art.

SUMMARY

Exemplary embodiments are directed to an apparatus and a method for detecting a passenger based on an image, which are capable of accurately detecting a passenger or an accompanying passenger using an image without adding a separate sensor to a vehicle and enhancing safety and convenience of a user by detecting whether a seat belt is worn.

In an embodiment, an apparatus for detecting a passenger and wearing seat belt based on an image includes an image detector configured to detect an image of an interior of a vehicle, which is captured using a camera, a controller configured to analyze the image of the interior of the vehicle, which is captured through the image detector, and determine whether a passenger is present and whether the passenger wears a seat belt, and an information output part configured to output a warning or an alarm according to discrimination of the passenger from an object, which is determined by the controller, the presence or absence of the passenger, and whether the passenger wears the seat belt.

In the present disclosure, the controller may set a plurality of regions of interest (ROIs) in the image detected by the image detector and analyze the plurality of ROIs to determine the presence or absence of the passenger, the presence or absence of a car seat, the presence or absence of an empty seat, and the presence or absence of the object.

In the present disclosure, the controller may set a first ROI (ROI #1) for detecting a face of the passenger, a second ROI (ROI #2) for detecting an appearance of the passenger, an empty seat, the object, and a car seat, and a third ROI (ROI #3) for determining whether the passenger wears the seat belt or the seat belt is worn on the car seat.

In the present disclosure, the controller may set the first ROI (ROI #1) and the second ROI (ROI #2) such that an entirety of the face of the passenger should always be shown in the first ROI (ROI #1) regardless of a position of a seat slate, an appearance from the face to a knee of the passenger should always be show in the second ROI (ROI #2) regardless of the position of a seat slate, an entirety of a seat should always be show in the second ROI (ROI #2) regardless of the position of a seat slate, and, when a slope of the seat is declined in a forward direction, an entirety of the face of the passenger should always be show in the first ROI (ROI #1), and, when the seat is declined in the forward direction, the appearance from the face to the knee of the passenger should always be show in the second ROI (ROI #2), and, when the seat is declined in the forward direction, the entirety of the seat should always be show in the second ROI (ROI #2).

In the present disclosure, the controller may set the third ROI (ROI #3) such that the seat belt should always be show in the third ROI (ROI #3) regardless of a position of a seat slate and, when a slope of the seat is declined in a forward direction, the seat belt should always be show in the third ROI (ROI #3).

In the present disclosure, the image detector may include a digital camera to which an angle of view and a filter, which are capable of capturing front and rear seats at a time, are applied.

In the present disclosure, the camera may include a high angle of view fisheye lens or an infrared (IR) lens.

In the present disclosure, a communication function may be added to the information output part, and the information output part may be capable of outputting a warning or an alarm through a designated mobile communication terminal according to the presence or absence of the passenger and whether the passenger wears the seat belt.

In an embodiment, a method of detecting a passenger and wearing seat belt based on an image includes setting, by a controller, a first region of interest (ROI) and a second ROI from a received camera image, detecting, by the controller, whether a passenger rides in a vehicle through analysis of a face and an appearance in the first ROI and the second ROI, and, when the passenger is detected as riding in the vehicle, setting, by the controller, a third ROI and determining whether a seat belt is worn through analysis of the third ROI, and, when the passenger does not wear the seat belt according to the determination, outputting, by the controller, an alarm indicating that the seat belt is not worn.

In the present disclosure, the method may further include, when the passenger does not ride in the vehicle, determining, by the controller, whether an empty seat or an object is placed on a seat through image analysis of the second ROI, and, as the determination result of the image analysis of the second ROI, when the object placed on the seat is a car seat, setting, by the controller, the third ROI and determining whether the seat belt is worn through analysis of the third ROI region, and, when the passenger does not wear the seat belt according to the determination, outputting, by the controller, an alarm indicating that the seat belt is not worn.

In the present disclosure, as the determination result of the image analysis of the second ROI, when the car seat is not detected, in order to check whether the seat is an empty seat, the method may further include comparing, by the controller, the second ROI with an image captured in an initial state in which the passenger is absent, and, when the seat is still in the initial state with no object, determining the seat as being the empty seat.

In the present disclosure, as the determination result of the image analysis of the second ROI, when the car seat is not detected, the method may further include comparing, by the controller, the second ROI with the image captured in the initial state in which the passenger is absent, and, when an object is present and is not the car seat, determining the object as being placed on the seat.

In the present disclosure, the first ROI (ROI #1) may be an ROI for detecting, by the controller, a face of the passenger, the second ROI (ROI #2) may be an ROI for detecting, by the controller, an appearance of the passenger, an empty seat, an object, and a car seat, and the third ROI (ROI #3) may be an ROI for determining, by the controller, whether the passenger wears the seat belt or the seat belt is worn on the car seat.

In the present disclosure, the controller may set the first ROI (ROI #1) and the second ROI (ROI #2) such that an entirety of the face of the passenger should always be shown in the first ROI (ROI #1) regardless of a position of a seat slate, an appearance from the face to a knee of the passenger should always be show in the second ROI (ROI #2) regardless of the position of a seat slate, an entirety of a seat should always be show in the second ROI (ROI #2) regardless of the position of a seat slate, and, when a slope of the seat is declined in a forward direction, an entirety of the face of the passenger should always be show in the first ROI (ROI #1), and, when the seat is declined in the forward direction, the appearance from the face to the knee of the passenger should always be show in the second ROI (ROI #2), and, when the seat is declined in the forward direction, the entirety of the seat should always be show in the second ROI (ROI #2).

In the present disclosure, the controller may set the third ROI (ROI #3) such that the seat belt should always be show in the third ROI (ROI #3) regardless of a position of a seat slate and, when a slope of the seat is declined in a forward direction, the seat belt should always be show in the third ROI (ROI #3).

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
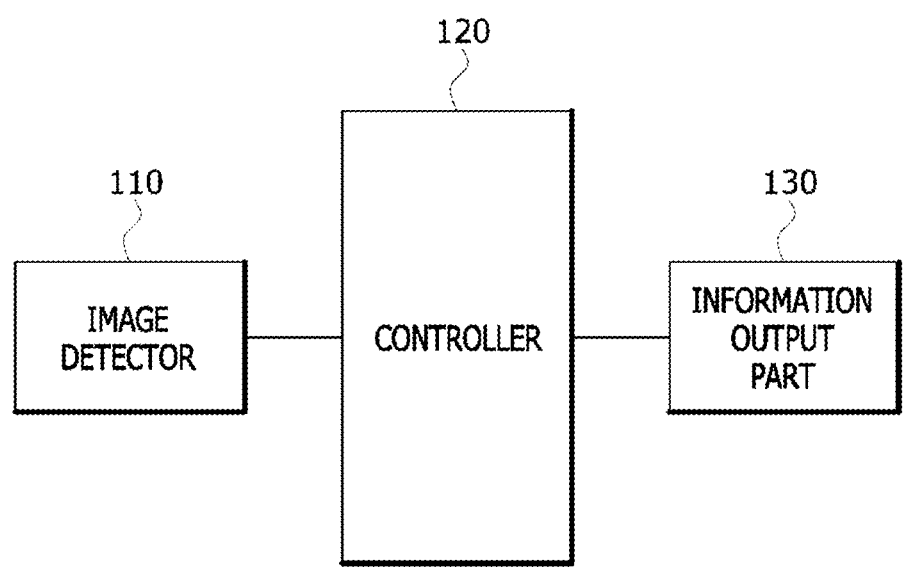
FIG. 1 is an exemplary diagram illustrating a schematic configuration of an apparatus for detecting a passenger and wearing seat belt based on an image according to an embodiment of the present disclosure.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and a method for detecting a passenger and wearing seat belt based on an image according to the present disclosure invention will be described with reference to the accompanying drawings through various examples of embodiments.

In the following description, thicknesses of lines and sizes of components shown in the drawings may be exaggerated for clarity and convenience of description. In addition, the terms described below are defined in consideration of the functions of the present disclosure, and these terms may be varied according to the intent or custom of a user or an operator. Therefore, the definitions of the terms used herein should follow contexts disclosed herein.

FIG. 1 is an exemplary diagram illustrating a schematic configuration of an apparatus for detecting a passenger and wearing seat belt based on an image according to an embodiment of the present disclosure.

As shown in FIG. 1, the apparatus for detecting a passenger and wearing seat belt based on an image according to the present embodiment includes an image detector 110, a controller 120, and an information output part 130.

The image detector 110 includes a camera for capturing an interior of a vehicle.

The camera is a digital camera which is attached to an upper portion of a windshield (front glass window) or a ceiling of the vehicle and to which an angle of view (e.g., an angle of view of 190 degree) and a filter (e.g., a high-pass filter (HPF)), which are capable of capturing front and rear seats at a time, are applied. The camera may include an infrared (IR) camera.

Further, the camera may include a camera using a fish-eye lens for a high angle of view.

The fish-eye lens is an ultra-wide-angle lens having an angle of view of 180 degrees or more. The fish-eye lens is named because, when a fish looks up in water, the fish can see everything above a surface of water due to a refractive index of the water.

The fisheye lens is a lens made using spherical aberration and made on the principle of focusing using a large concave lens in a front portion. Owing to the large concave lens, a barrel-shaped round distortion occurs. When the large concave lens is used, an angle of view of 190 degrees or more may be secured, and this technology may be used to monitor an entirety of an interior of a vehicle using a single camera.

The controller 120 detects the presence or absence of a passenger (or an accompanying passenger) and whether the passenger (or the accompanying passenger) wears a seat belt based on an entire image of the interior of the vehicle, which is captured by the image detector 110. More specifically, the controller 120 discriminates the passenger from an object using the entire image of the interior of the vehicle, which is captured through a single high angle of view camera located at a ceiling, and determines whether the passenger wears a seat belt.

The information output part 130 outputs a warning or an alarm according to the discrimination of the passenger from the object, whether the passenger (or an accompanying passenger) is present, and whether the passenger wears the seat belt, which are checked in the controller 120. In this case, when a communication function is added to the information output part 130, the information output part 130 may output a warning or an alarm according to the presence or absence of the passenger (or the accompanying passenger) and whether the passenger wears the seat belt through a designated mobile communication terminal (e.g., a mobile phone or a smartphone).

In the present embodiment, the determination of the presence or absence of the passenger is essential to a device which is capable of enhancing safety and convenience of a driver, such as deployment control of an airbag, detection of an unattended passenger in the vehicle, and control of the air conditioning system.

The controller 120 sets a region of interest (ROI) in the image acquired through the image detector 110 and determines whether the ROI region is the passenger, a car seat, an empty seat, or an object.

When the passenger (or the accompanying passenger) or the car seat is detected, the controller 120 analyzes the image to determine whether the passenger wears the seat belt or not.

In this case, the reason for determining whether the passenger (or the accompanying passenger) wears the seat belt is that, when the passenger (or the accompanying passenger) does not wear the seat belt, there is a purpose to accurately detect a case in which a seat belt buckle is manually separated from the seat belt to be engaged so as to prevent a warning sound of the SBR. Further, the reason for determining whether the seat belt is worn when the car seat is present is that the seat belt should be engaged so as to securely fix the car seat to a passenger seat.

Figure 2:
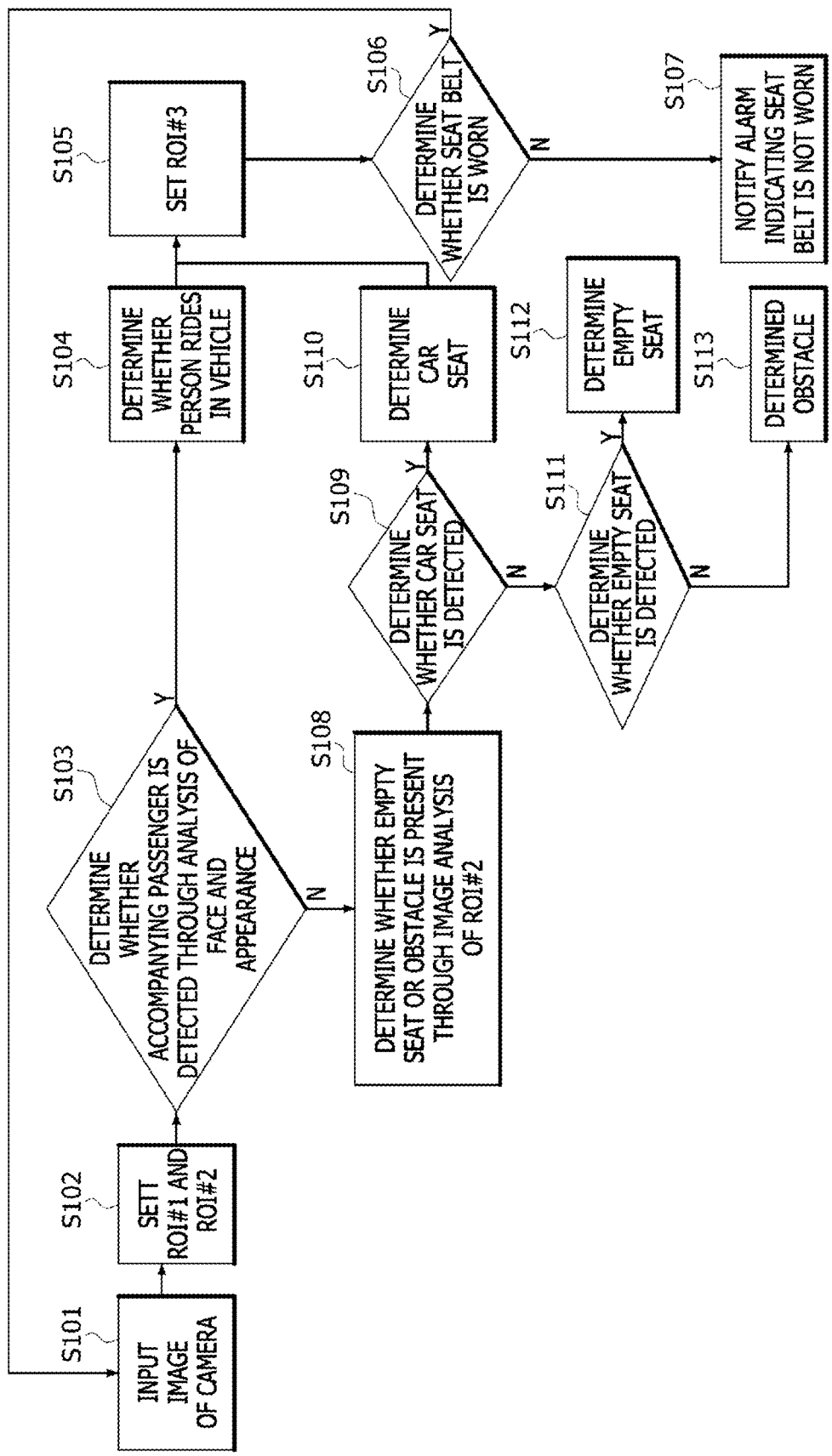
FIG. 2 is a flowchart for describing a method of detecting a passenger and wearing seat belt based on an image according to an embodiment of the present disclosure.

FIG. 2 is a flowchart for describing a method of detecting a passenger and wearing seat belt based on an image according to an embodiment of the present disclosure.

Figure 3:
FIG. 3 is an exemplary diagram illustrating a first region of interest (ROI) and a second ROI which are set by receiving a camera image in FIG. 2.

Referring to FIG. 2, when a camera image is input through the image detector 110 (S101), the controller 120 sets a first ROI ROI #1 and a second ROI ROI #2 (S102) (see FIG. 3).

FIG. 3 is an exemplary diagram illustrating the first ROI ROI #1 and the second ROI ROI #2 which are set by receiving the camera image in FIG. 2.

Here, the first ROI ROI #1 is an ROI for detecting a face of the passenger, and the second ROI ROI #2 is an ROI for detecting an appearance of the passenger, an empty seat, an object, and the car seat. That is, the controller 120 analyzes the first ROI ROI #1 to determine the presence or absence of the passenger and analyzes the second ROI ROI #2 to determine the presence or absence of the passenger and detect whether the empty seat is present and the passenger or the object is present, and the car seat is mounted.

For reference, conditions for setting the first ROI ROI #1 and the second ROI ROI #2 will be described.

For example, in order to set the first ROI ROI #1 and the second ROI ROI #2, (1) when a seat slate is located at a foremost side, an intermediate side, or a rearmost side, an entirety of the face of the passenger should always be shown in the first ROI ROI #1, (2) when the sheet slate is located at the foremost side, the intermediate side, or the rearmost side, an appearance (from the face to a knee of the passenger) should always be show in the second ROI ROI #2, (3) when the sheet slate is located at the foremost side, the intermediate side, or the rearmost side, an entirety of a seat should always be show in the second ROI ROI #2, (4) when a slope of the seat is declined in a forward direction (is lying or is leaned down), an entirety of the face of the passenger should always be show in the first ROI ROI #1. (5) when the slope of the seat is declined in the forward direction (is lying or is leaned down), the appearance (from the face to a knee of the passenger) should always be show in the second ROI ROI #2, and (6) when the slope of the seat is declined in the forward direction (is lying or is leaned down), the entirety of the seat should always be show in the second ROI ROI #2.

Figure 4:
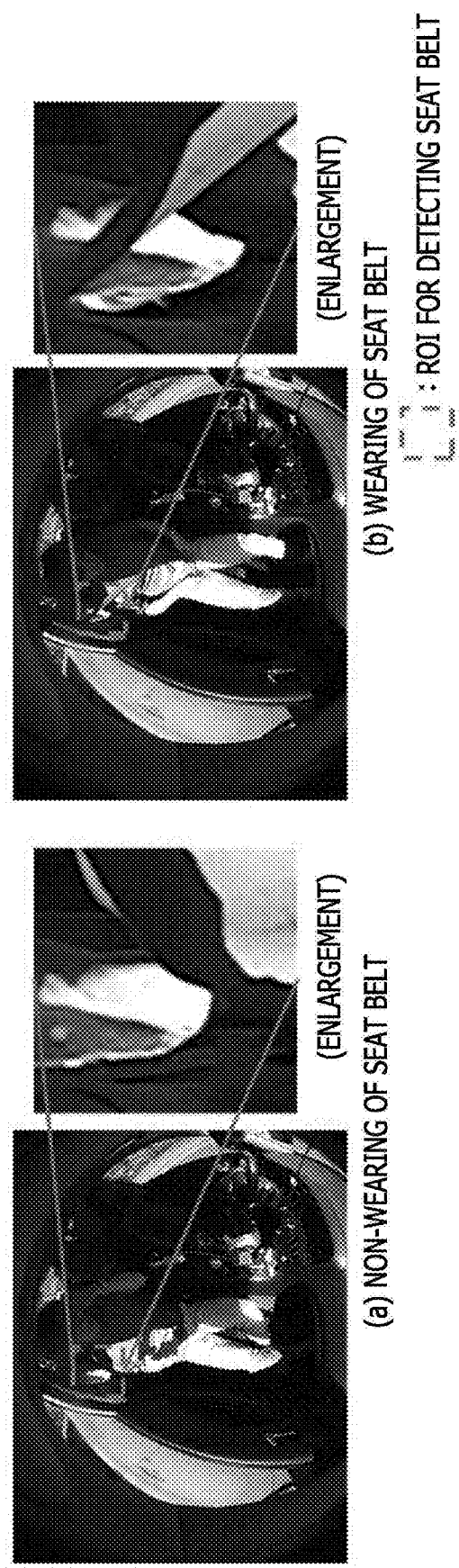
FIG. 4 is an exemplary diagram illustrating a third ROI which is set by receiving the camera image in FIG. 2.

Further, in the present embodiment, when the passenger rides in the vehicle, a third ROI ROI #3 for detecting whether the seat belt is worn may be additionally set (S105) (see FIG. 4).

FIG. 4 is an exemplary diagram illustrating the third ROI ROI #3 which is set by receiving the camera image in FIG. 2. FIG. 4A is an exemplary diagram illustrating an image analysis screen of the third ROI ROI #3 in a state in which the seat belt is not worn, and FIG. 4B is an image analysis screen of the third ROI ROI #3 in a state in which the seat belt is worn.

Here, the third ROI ROI #3 is an ROI for determining whether the passenger wears the seat belt. That is, the controller 120 analyzes the third ROI ROI #3 to detect whether the passenger wears the seat belt.

For reference, a condition for setting the third ROI ROI #3 will be described.

For example, in order to set the third ROI ROI #3, (1) when the seat slate is located at the foremost side, the intermediate side, or the rearmost side, an entirety of the seat slate should always be shown in the third ROI ROI #3, and (2) when a slope of the seat is declined in the forward direction (is lying or is leaned down), the seat slate should always be shown in the third ROI ROI #3.

Referring to FIG. 2 again, the controller 120 detects whether the passenger (or the accompanying passenger) rides in the vehicle through analysis of the face and the appearance of the passenger in the first ROI ROI #1 and the second ROI ROI #2 (S103).

For reference, a method of detecting whether the passenger (the accompanying passenger) rides in the vehicle by only the face analysis is well operated when the face of the passenger is facing forward. However, in a situation in which the passenger is lying on a side or looking at a rear side, the face is not shown such that the presence or absence of the passenger may be determined. However, in the present embodiment, since the presence or absence of the passenger is determined according to the appearance detection result, unlike the related art, even when the presence or absence of the passenger is not determined by the face, it is possible to determine the presence or absence of the passenger through the appearance analysis.

As the detection result of the presence or absence of the passenger (S103), when it is determined that the passenger (person) rides in the vehicle (YES of S103 and S104), the controller 120 sets the third ROI ROI #3 (S105) and determines whether the seat belt is worn through analysis of the third ROI ROI #3 (S106).

For reference, when the passenger (or the accompanying passenger) is present, the reason for determining whether the seat belt is worn through the analysis of the image is that there is a case in which a buckle is manually separated to be engaged so as to prevent the SBR warning sound. Further, when the car seat (S110) is present, the reason for determining whether the seat belt is worn through the analysis of the image is that engagement is required with respect to the car seat so as to secure the car seat to a passenger seat.

As the determination result (S106), when the passenger wears the seat belt (YES of S106), the process returns to operation S101. Otherwise, when the passenger does not wear the seat belt (NO of S106), the controller 120 outputs a warning (e.g., an alarm for not-wearing the seat belt) through the information output part 130 (S107).

Meanwhile, as the detection result of the presence or absence of the passenger (S103), when the passenger (person) does not ride in the vehicle (NO of S103), the controller 120 determines whether the empty seat or other object (in particular, the car seat) is placed through image analysis of the second ROI ROI #2 (S108).

As the determination result through the image analysis of the second ROI ROI #2 (S108), when the car seat is detected (YES of S100 and S110), the controller 120 sets the third ROI ROI #3 (S105) and determines whether the seat belt is worn through the analysis of the third ROI ROI #3 (S106). Further, as the determination result (S106), when the passenger wears the seat belt (YES of S106), the process returns to operation S101. Otherwise, when the passenger does not wear the seat belt (NO of S106), the controller 120 outputs the warning (e.g., the alarm for not-wearing the seat belt) through the information output part 130 (S107).

Further, as the determination result through the image analysis of the second ROI ROI #2 (S108), when the car seat is not detected (NO of S109), the controller 120 checks whether the seat is an empty seat (S111). When no object is present in the second ROI ROI #2 (i.e., when there is no object on the seat as compared to the image captured in an initial state without the passenger), the controller 120 determines that the seat is the empty seat (S112).

However, when something is present different from the initial state in the second ROI ROI #2 (i.e., when some object is determined as being present on the seat different from the initial state through a comparison with the initial state in which the passenger is not present), the controller 120 determines that an object is placed on the sheet (S113).

As described above, the present embodiment overcomes the limitation of the related art and has an effect which is capable of minimizing occurrence of a false positive alarm for convenience of the user, preventing a variation performance due to an external lighting change, detecting a passenger in various riding postures (e.g., a lying down posture and a forward bowing posture and when a face of the passenger is not shown, and detecting, even when only the seat belt buckle is manually separated to be engaged so as to prevent the warning sound of the SBR, whether the seat belt is normally worn through the image analysis.

According to one aspect of the present disclosure, a passenger or an accompanying passenger can be accurately detected using an image without adding a separate sensor to a vehicle and safety and convenience of a user can be enhanced by detecting whether a seat belt is worn.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims. Therefore, the technical scope of the disclosure should be defined by the following claims.

What is claimed is:

1. An apparatus configured to detect a passenger and a seat belt based on an image, comprising:
   an image detector configured to detect an image of an interior of a vehicle, which is captured using a camera, the image detector positioned within the vehicle;
   a controller configured to analyze the image of the interior of the vehicle, which iscaptured through the image detector, and determine whether a passenger is present andwhether the passenger wears a seat belt; and
   an information output part configured to output a warning or an alarm according todiscrimination of the passenger from an object, which is determined by the controller, the presence or absence of the passenger, and whether the passenger wears the seat belt,
   wherein the controller sets a first ROI for detecting a face of the passenger, a second ROI for detecting an appearance of the passenger, an empty seat, the object, and a car seat, and a third ROI for determining whether the passenger wears the seat belt or the seat belt is worn on the car seat, and
      wherein the controller sets a third ROI such that the seat belt should always be shown in the third ROI regardless of a position of a seat slate and, when a slope of the seat is declined in a forward direction, the seat belt should always be shown in the third ROI.

2. The apparatus of claim 1, wherein the controller sets a plurality of regions of interest (ROIs) in the image detected by the image detector and analyzes the plurality of ROIs to determine the presence or absence of the passenger, the presence or absence of a car seat, the presence or absence of an empty seat, and the presence or absence of the object.

3. The apparatus of claim 1, wherein the controller sets the first ROI and the second ROI such that an entirety of the face of the passenger should always be shown in the first ROI regardless of a position of a seat slate, an appearance from the face to a knee of the passenger should always be shown in the second ROI regardless of the position of a seat slate, an entirety of a seat should always be show in the second ROI regardless of the position of a seat slate, and, when a slope of the seat is declined in a forward direction, an entirety of the face of the passenger should always be shown in the first ROI, and, when the seat is declined in the forward direction, the appearance from the face to the knee of the passenger should always be shown in the second ROI, and, when the seat is declined in the forward direction, the entirety of the seat should always be shown in the second ROI.

4. The apparatus of claim 1, wherein the image detector includes a digital camera to which an angle of view and a filter, which are capable of capturing front and rear seats at a time, are applied.

5. The apparatus of claim 1, wherein the camera includes a high angle of view fisheye lens or an infrared (IR) lens.

6. The apparatus of claim 1, wherein a communication function is added to the information output part, and the information output part is capable of outputting a warning or an alarm according to the presence or absence of the passenger and whether the passenger wears the seat belt through a designated mobile communication terminal.

7. A method of detecting a passenger and a seat belt based on an image, the method comprising:
   setting, by a controller, a first region of interest (ROI) and a second ROI from a received camera image received from a camera that is positioned within a vehicle;
   detecting, by the controller, whether a passenger rides in the vehicle through analysis of a face and an appearance in the first ROI and the second ROI;
   when the passenger is detected as riding in the vehicle, setting, by the controller, a thirdROI and determining whether a seat belt is worn through analysis of the third ROI;
   when the passenger does not wear the seat belt according to the determination, outputting, by the controller, an alarm indicating that the seat belt is not worn; and
   when the passenger does not ride in the vehicle, determining, by the controller, whether an empty seat or an object is placed on a seat through image analysis of the second ROI;
   as the determination result of the image analysis of the second ROI, when the object placed on the seat is a car seat, setting, by the controller, the third ROI and determining whether
   the seat belt is worn through analysis of the third ROI region; and
   when the passenger does not wear the seat belt according to the determination, outputting, by the controller, an alarm indicating that the seat belt is not worn.

8. The method of claim 7, further comprising:
   as the determination result of the image analysis of the second ROI, when the car seat is not detected, in order to check whether the seat is an empty seat, comparing, by the controller, the second ROI with an image captured in an initial state in which the passenger is absent, and, when the seat is still in the initial state with no object, determining the seat as being the empty seat.

9. The method of claim 8, further comprising:
   as the determination result of the image analysis of the second ROI, when the car seat is not detected, comparing, by the controller, the second ROI with the image captured in the initial state in which the passenger is absent, and, when an object is present and is not the car seat, determining the object as being placed on the seat.

10. The method of claim 7, wherein:
   the first ROI is an ROI for detecting, by the controller, a face of the passenger;
   the second ROI is an ROI for detecting, by the controller, an appearance of the passenger, an empty seat, an object, and a car seat; and
   the third ROI is an ROI for determining, by the controller, whether the passenger wears the seat belt or the seat belt is worn on the car seat.

11. The method of claim 10, wherein the controller sets the first ROI and the second ROI such that an entirety of the face of the passenger should always be shown in the first ROI regardless of a position of a seat slate, an appearance from the face to a knee of the passenger should always be shown in the second ROI regardless of the position of a seat slate, an entirety of a seat should always be shown in the second ROI regardless of the position of a seat slate, and, when a slope of the seat is declined in a forward direction, an entirety of the face of the passenger should always be shown in the first ROI, and, when the seat is declined in the forward direction, the appearance from the face to the knee of the passenger should always be shown in the second ROI, and, when the seat is declined in the forward direction, the entirety of the seat should always be shown in the second ROI.

12. The method of claim 10, wherein the controller set the third ROI such that the seat belt should always be shown in the third ROI regardless of a position of a seat slate and, when a slope of the seat is declined in a forward direction, the seat belt should always be shown in the third ROI.

\* \* \* \* \*